April 15, 1941. C. W. LEGUILLON 2,238,492
RESPIRATOR MASK
Filed Sept. 28, 1939 2 Sheets-Sheet 1
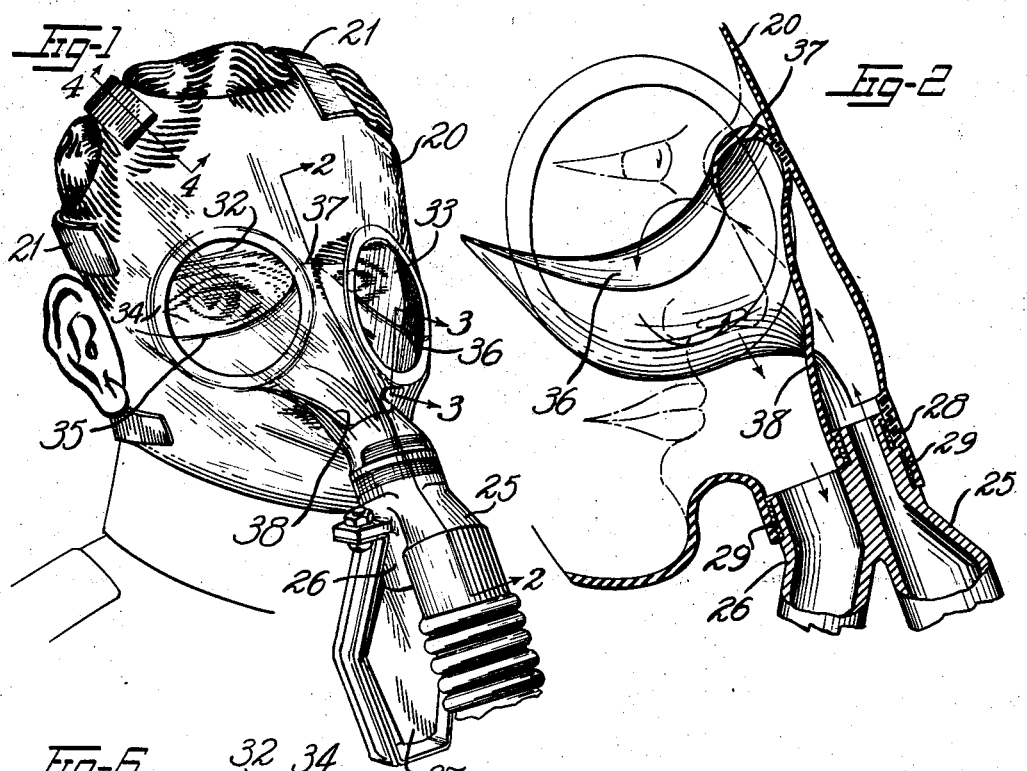
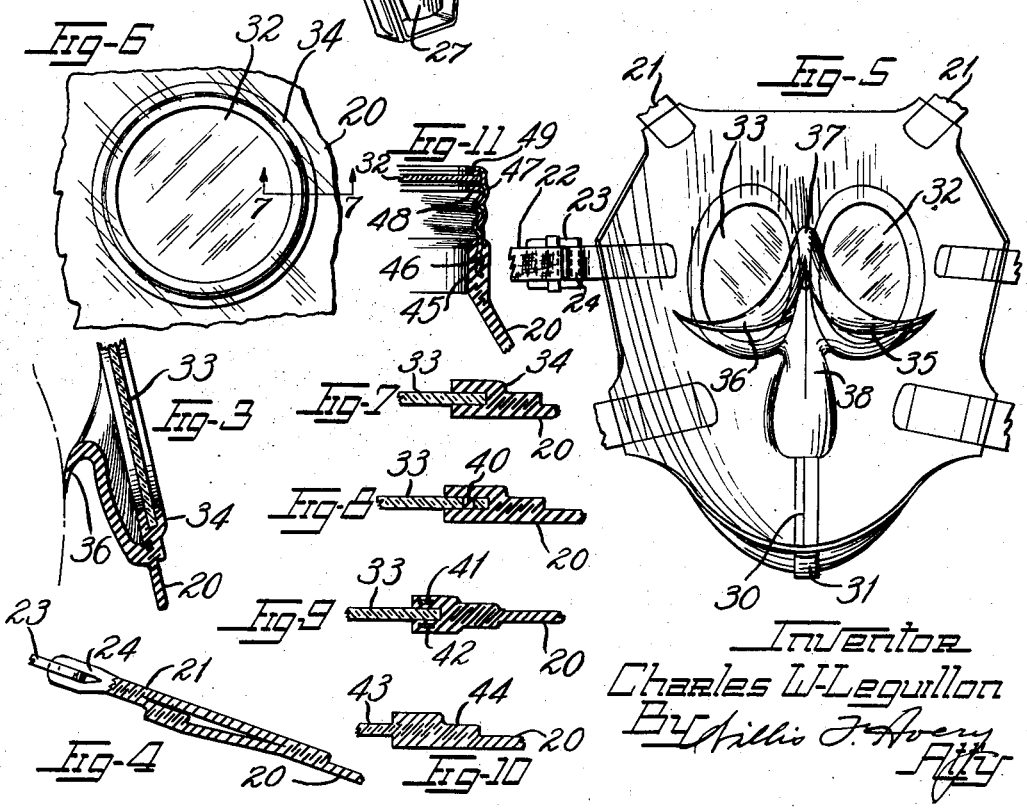
Inventor
Charles W. Leguillon

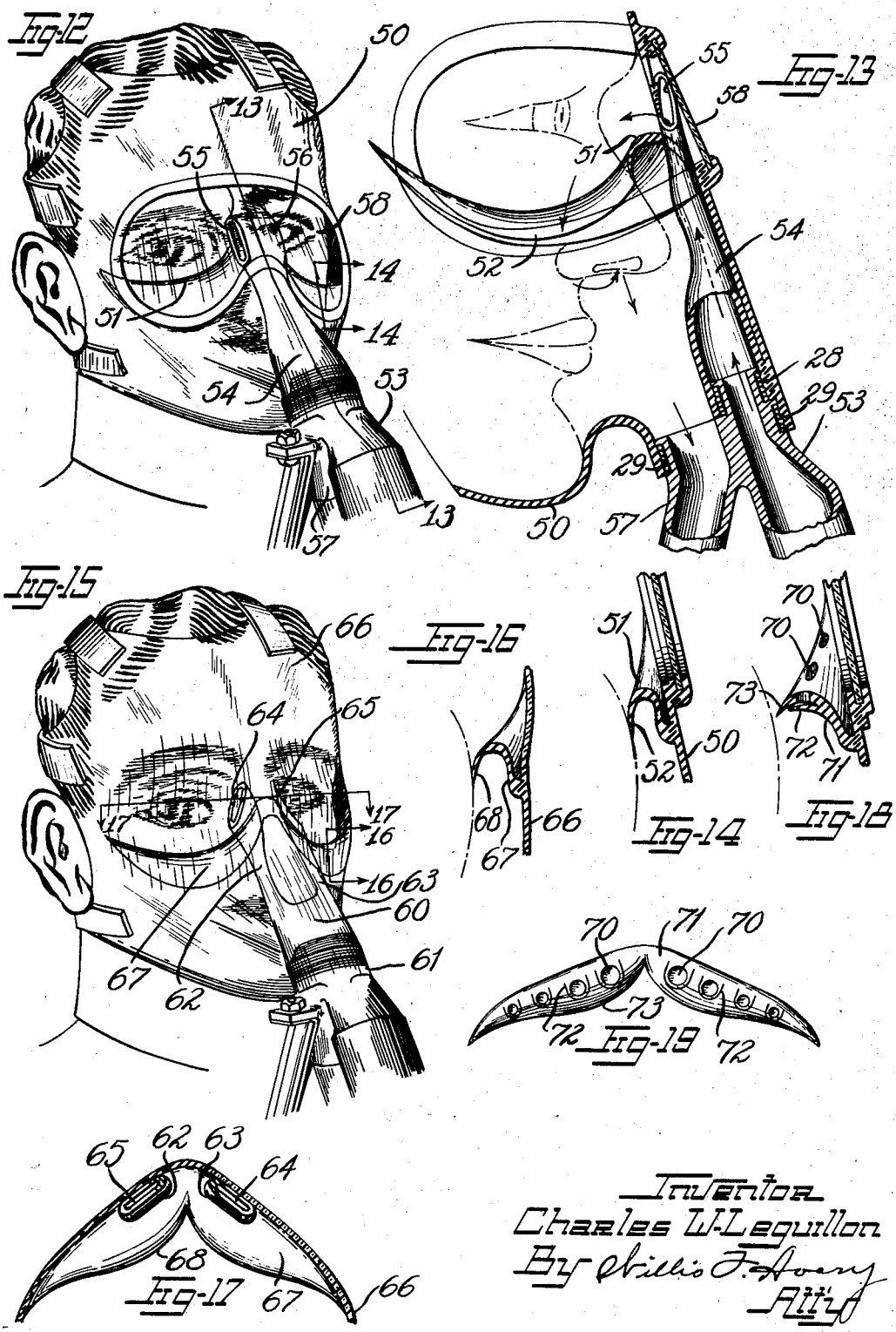

Patented Apr. 15, 1941

2,238,492

UNITED STATES PATENT OFFICE 2,238,492

RESPIRATOR MASK

Charles W. Leguillon, Akron, Ohio, assignor to
The B. F. Goodrich Company, New York, N. Y.,
a corporation of New York Application September 28, 1939, Serial No. 296,932

4 Claims. (Cl. 128—141)

This invention relates to respirator masks and especially masks of the type adapted to protect the wearer from the effects of noxious gases, dust and other objectionable substances.

One of the difficulties encountered in prior gas mask constructions is that fogging of the lenses has resulted from moisture in the breath. In an endeavor to overcome this difficulty it has been proposed to impinge the incoming air upon the lenses of the mask, but this expedient has had the objection in constructions proposed heretofore that upon exhalation the moisture from the breath nevertheless has reached the lenses and fogging has resulted, although intermittently and somewhat reduced.

Also gas masks heretofore have been more or less limited in the angle of vision provided. Even though the lenses have been large, they have required bulky attaching rims or frames that have limited the angle of vision. Such lenses have been mounted in face coverings of opaque material, which has made it difficult if not impossible to recognize the face of the wearer, and the grotesque appearance of such masks and the hiding of the face have been psychologically objectionable.

Chief objects of this invention are to provide a protective mask of such construction as to give the maximum angle of vision, to provide a mask of transparent, flexible material such that a large part of the face of the wearer remains visible, to provide inconspicuous and secure attachment of lenses and other parts to the face piece, to provide means for effectively reducing or eliminating fogging of the lenses, and to provide a mask of light weight and neat appearance.

These and further objects will be apparent from the following description reference being had to the accompanying drawings in which:

Fig. 1 is a perspective view of a gas mask constructed according to and embodying the invention and mounted upon a wearer.

Fig. 2 is a section taken along the line 2—2 of Fig. 1.

Fig. 3 is a section taken along the line 3—3 of Fig. 1.

Fig. 4 is a section taken along the line 4—4 of Fig. 1.

Fig. 5 is an elevation of the inside of the mask face piece with attaching harness and connections to the cannister and flutter valve removed.

Fig. 6 is a view on an enlarged scale of one of the eye portions of the mask.

Fig. 7 is a section taken along the line 7—7 of Fig. 6.

Figs. 8, 9, 10 and 11 are views like Fig. 7 but showing modified constructions.

Fig. 12 is a view like Fig. 1 but showing a modified construction.

Fig. 13 is a section taken along the line 13—13 of Fig. 12.

Fig. 14 is a section taken along the line 14—14 of Fig. 12.

Fig. 15 is a view like Fig. 1 but showing a further modified construction.

Fig. 16 is a section taken along the line 16—16 of Fig. 15.

Fig. 17 is a section taken along the line 17—17 of Fig. 15.

Fig. 18 is a view like Fig. 14 but showing a modified construction of the baffle structure.

Fig. 19 is a view as seen from above of the baffle structure of Fig. 18 before attachment to the face piece.

According to one feature of the invention I provide a mask face piece of transparent flexible material that is impervious to noxious gases, vapors, dust and other objectionable substances, constructed to provide a virtually unlimited angle of vision to the wearer, and visibility of the greater portion or entire face of the wearer so that the features of the wearer are more clearly recognizable through the mask. The eye pieces or lenses may be simply portions of the transparent face piece itself, but preferably are independent pieces secured to the face piece so that while the eye pieces may be of relatively stiff, transparent material for clearest vision, the remainder of the face piece may be of more flexible transparent material for maximum comfort to the wearer and most effective sealing of the face chamber. The eye pieces preferably are secured to the face piece by heat-sealed seams which provide an intimate bonding of the materials for a strong union with minimum bulk and maximum light transmission. All other seams and joints preferably are heat-sealed also for like reasons. The heat sealing is effected by the application of heat and pressure as by the use of a hot iron. It is preferred to use flexible transparent materials that are capable of being heat-sealed readily, but if desired, the transparent flexible materials may be adhesively united, or united by mechanical fasteners, supplemental to the heat-sealing or in lieu thereof.

The face piece may be provided of any suitable transparent flexible material. By way of example may be mentioned such materials as cellulose derivatives including cellulose acetate and cellulose nitrate; rubber and rubber derivatives such as rubber isomers and rubber hydrochloride; and polymeric materials such as the various polymers and copolymers of acrylic compounds, including methyl methacrylate, and of vinyl compounds, such as vinyl esters and ethers, including vinyl chloride, vinyl acetate, as well as styrene, and of dienes, such as butadiene, and derivatives of such polymeric materials, such as polyvinyl acetals; including sufficient proportions of plasticizers, where necessary to provide the properties of flexibility and durability. The materials may be provided either in sheet form or in any suitable molded form.

The transparent eye pieces or lenses may be of any suitable transparent material including, for example, those above listed and glass and combinations thereof, including laminated glass to resist breakage.

The transparent flexible materials may be provided in varying degrees of flexibility or stiffness and, as is hereinabove explained, it is preferred to use a relatively flexible material for the face piece and a relatively stiff material for the eye pieces. Good results have been obtained with a face piece of the material sold under the trade name "Koroseal" (an insoluble polymer of vinyl chloride plasticized to give a rubber-like gel) and eye pieces of a copolymer of vinyl chloride and vinyl acetate with little or no plasticizer added so that it will maintain the desired stiffness. These materials are readily heat-sealed as by the application of a hot iron. It will be understood, however, that the invention is not wholly limited to any particular kind of transparent flexible material.

Provision is made for dividing the face chamber into an upper, sight subchamber and a lower subchamber for breathing. To this end a baffle structure is disposed transversely across the mask preferably just below the eyes, the baffle structure being constructed and arranged to permit passage of air from the upper subchamber to the lower subchamber upon inhalation and to impose resistance to or prevent flow of air in the reverse direction upon exhalation. Inlet conduit means is provided opening into the upper subchamber preferably so that incoming air passes over the eye pieces before being drawn into the lower subchamber, and outlet means is connected to the lower subchamber.

For most effective operation it is preferred that the baffle structure comprise valve means of a check valve nature. This may be provided, for example, in the form of a flexible and resilient lip extending downwardly and toward the face, which lip is flexed toward the face upon an excess of differential pressure in the lower subchamber to retard or prevent flow of air upward into the upper subchamber, and is flexed away from the face upon an excess of differential pressure in the upper subchamber to permit downward flow, which occurs upon inhalation. To the same end, flaps or other valve means may be provided in association with the baffle.

With reference to the embodiment of Figs. 1 to 7, the mask comprises a face piece 20 of transparent, flexible material, as hereinbefore described, having a plurality of tabs 21, 21 connected to a head harness 22 which may comprise straps adjustable for fit in buckles 23. The tabs 21 of the transparent flexible material preferably are formed in a loop of integral heat-sealed construction to receive the buckle 23, as shown at 24 in Fig. 4.

At the lower front of the mask is provided a connection 25 to a protective cannister, and an outlet connection 26 to a flutter valve 27. The cannister and the flutter valve may be of any suitable construction. The transparent face piece, which may be of tailored sheet material or material molded to shape, is formed around the upper ends of connections 25 and 26 preferably by first wrapping the connections with layers 28, 29 of cord to which the material of the face piece is subsequently heat-sealed by the application of heat and pressure as by the use of a hot iron. If desired, the cord wrappings may be coated and impregnated with an adhesive capable of being bonded to the material of the face piece in the heat-sealing process to assure a tight and secure connection, or the face piece in some cases may be adhered to the cord, or mechanically clamped thereto.

The face piece is continuous under the chin, over the cheeks and across the forehead. It is found that a seal is thus provided despite variations in faces, the flexibility of the material being effective to cause the material to fit the face closely. In case the face-piece is formed from sheet material, the face-fitting shape may be given by bringing together the cut margins 30 of the sheet beneath the chin and heat sealing the margins together with a reinforcing strip 31 of the transparent material.

Eye pieces 32, 33 of transparent material, preferably stiffer than the material of the face-piece to minimize distortion of the vision, are mounted in apertures in the face piece preferably by heat-sealing. Each eye-piece may be formed in overlapping relation with the margin of the face piece as is shown, for example, in Figs. 3, 6 and 7 and an overlying tape 34, which may also be of flexible transparent material, covers the overlapping margin. These three elements may then be united by heat-sealing to form a strong and tight seam.

The baffle structure may be conveniently combined with conduit means for conducting air from the cannister connection 25 to the region of the eye pieces, the air being conducted upwardly between the lower part of the baffle structure and the material of the face piece. The baffle structure comprises lip portions 35 and 36 extending across the face just below the eyes and joined by a portion 37 across the nose. These lips are curved to conform to the curvature of the face in this region, and while they may or may not actually touch the face of the wearer they are preferably flexible and extend downwardly toward the face of the wearer where they terminate in thin flexible margins to serve by a valve action to resist upward movement of air more strongly than downward movement.

These lips may be provided in the form of extensions at the upper end of a conduit portion 38 of the baffle shaped to provide a passageway between the portion 38 and the face piece leading from the cannister connection 25 to the upper subchamber over the lip portions 35 and 36 so that incoming air will be caused to flow against the two eye pieces and then over the lips 35 and 36 down into the lower subchamber for inhalation. The margins of the conduit portions 38 of the baffle preferably are heat-sealed to the face piece, and for further promoting the maintenance of the proper shape for holding the intake passageway open the portion 38 may be suitably stiffened by increased thickness or increased stiffness of the material. The baffle piece may be molded to shape or it may be tailored from sheet material. Preferably the baffle is formed of transparent flexible material, although this part may be provided of translucent or opaque material having the desired flexibility and preferably also resilience in the lips.

Upon inhalation by the wearer air is drawn from the cannister 25 upwardly through the conduit between the portion 38 and the face piece 20, over the lips 35 and 36 down into the lower subchamber. Exhalation builds up pressure in the lower subchamber sufficient to open the flutter valve 27 for exhaust, and the lips 35 and 36 of the baffle structure serve in the manner hereinbefore described to resist upward flow of the air thereby maintaining the upper subchamber of low moisture content and at a temperature nearly that of the outside air so that fogging of the eye-pieces is minimized or entirely prevented.

Figs. 8, 9, 10 and 11 show modified attachments of the lenses to the face-piece. In Fig. 8 the construction is like that of Fig. 7 except that apertures 40 are provided near the edge of the lenses through which the transparent material is flowed in the best sealing operation for the sake of firm attachment of the lenses to the face-piece to resist pulling forces that would tend to loosen the attachment. In Fig. 9 rings or bands 41, 42 are embedded in the transparent material adjacent the margins of the lenses for reinforcing the attachment. Referring to Fig. 10, in a case where the material of the lenses is such that it may be integrally united with the material of the face-piece by heat-sealing a homogeneous structure is provided, even though the lens 43 is of stiff transparent material as compared with the face-piece 20. As in the previous embodiments a uniting strip 44 of transparent material is mounted in super-imposed relation to the margin of the lens and the face-piece and in this case the three elements are united integrally by heat-sealing.

In cases where it is desired to mount the lenses in metal rims projecting forwardly of the face-piece the construction of Fig. 11 may be used. Here the transparent flexible material 20 of the face-piece is extended forwardly at 45 in which extending portion is embedded the margin of a metal rim or band 46 which may be corrugated helically as shown for increased strength and to provide screw attachment for a super-imposed band 47. The bottom margins of the flanges 46 and 47 are turned inwardly at 48, 49 to receive the margin of an eye-piece 32 which with suitable gaskets may be clamped in gas-tight relation between the portions 48 and 49 upon screwing the band 47 upon the band 46. This provides a convenient arrangement for replacing lenses in the field.

The objects of the invention, including extensive transparency, and the baffle structure having the valve action, may be provided also in other constructions. With reference to the embodiments of Figs. 12, 13 and 14, the construction is generally like that described for the first embodiment, including the provision of a transparent face-piece 50 and a baffle 51 having lips 52 providing a valve action, but in this embodiment the air is conducted from an inlet 53 by a tubular conduit 54 directly to the region between the eyes where side openings 55, 56 let the air into the upper sub-chamber of the mask where it is directed laterally onto the lens. The air is then drawn down into the lower subchamber for breathing past the valve lips 52 of the baffle. As in the first embodiment, upon exhalation the valve lips 52 resist upward flow of the air while the exhaled air is discharged through the outlet 57. As will be seen most clearly in Fig. 12 the lens 58 may extend entirely across the eye region of the face in goggle fashion. This one-piece lens may be of stiffly flexible material, or glass, preferably laminated, suitably bent to conform to the desired shape of the face-piece.

In Figs. 15, 16 and 17 the construction is somewhat similar to that of the embodiment of Figs. 12 to 14, but in this embodiment the inlet conduit 60 is divided shortly above the intake connection 61 so that air is conducted individually to each eye pocket by branches 62, 63 of the conduit. The branches have oblique upper ends 64, 65 so that the inhaled air is drawn outwardly and upwardly for effective coverage of the eye-piece before the air is drawn down into the lower subchamber for breathing. In this embodiment the eye-pieces are formed as continuations of the face-piece 66 itself. This provides greater visibility of the features of the wearer and is useful in many applications, although stiff lenses are preferred for such uses as require maximum clarity of vision, for example in sighting a firearm. As in the embodiments heretofore described a baffle structure 67 is provided having flexible and preferably resilient lips 68 to permit downward flow of air but to resist upward flow.

Referring to Figs. 18 and 19, in some cases it may be desirable to provide apertures 70, 70 through the baffle to increase the down flow of air through the baffle 71. Resilient flaps 72, 72 may be provided integral with the baffle at the lower side, which flaps are adapted to close the apertures upon exhalation to resist or prevent upward flow of air through the apertures. Such valved apertures may be provided in lieu of the flexible lips hereinbefore described, or as a supplement to the flexible lips for providing the check valve action. The lip 73 need not actually touch the face of the wearer, approximate contact being sufficient in most cases to prevent objectionable fogging.

In the embodiments hereinbefore described actual contact of the valve lip of the baffle with the face of the wearer is shown, but it will be understood that actual contact or only approximate contact may be provided, as desired.

Variations may be made without departing from the scope of the invention as it is hereinafter claimed.

I claim:

1. A respirator mask providing a face piece providing a face chamber, a baffle structure extending transversely of the mask in said chamber and providing an upper subchamber at the eye portion and a lower subchamber for breathing, said baffle comprising a flexible lip extending downwardly and toward the face of the wearer approximately in contact with the latter, said lip being effective to permit flow of the main body of air for breathing from said upper subchamber into said lower subchamber along the face of the wearer more easily than flow in the reverse direction, intake means opening into said upper subchamber and outlet means for said lower subchamber.

2. A respirator mask providing a face-chamber, a baffle structure extending transversely of the mask in said chamber and providing an upper subchamber at the eye portion and a lower subchamber for breathing, said baffle comprising a marginal flexible lip portion extending downwardly in a direction to approach the face of the wearer gradually and terminating in an edge approximately in contact with the face so that said lip is effective to permit flow of the main body of air for breathing from said upper subchamber into said lower subchamber along the face of the wearer more easily than flow in the reverse direction, intake means into said upper subchamber, and outlet means for said lower subchamber.

3. A respirator mask providing a face-chamber, a baffle structure extending transversely of the mask in said chamber and providing an upper subchamber at the eye portion and a lower subchamber for breathing, said baffle comprising a marginal flexible lip portion extending downwardly in a direction to approach the face of the wearer gradually and terminating in an edge approximately in contact with the face so that said lip is effective to permit flow of the main body of air for breathing from said upper subchamber into said lower subchamber along the face of the wearer more easily than flow in the reverse direction, intake means into said upper subchamber, and outlet means for said lower subchamber, said marginal flexible lip portion being of decreasing thickness and increasing flexibility toward said edge providing self supporting strength of said portion together with flexibility for effective lip valve action.

4. A respirator mask comprising a face plate of transparent flexible polymer of vinyl chloride, a relatively stiff eye piece of vinyl chloride material to which the face piece is heat sealed, a baffle element of vinyl chloride material extending across the nose and upper front cheek portions and occupying an extensive area adjacent the eye region and heat sealed to the inner wall of the face piece dividing the mask chamber into an upper subchamber and a lower subchamber, said baffle comprising a marginal flexible lip portion extending downwardly in a direction to approach the face of the wearer gradually and being of decreasing thickness and increasing flexibility toward the face of the wearer and terminating in an edge approximately in contact with the face so that said lip is effective to permit flow of the main body of air for breathing from said upper subchamber into said lower subchamber along the face of the wearer more easily than flow in the reverse direction.

CHARLES W. LEGUILLON.